(12) United States Patent
Gupta et al.

(10) Patent No.: US 10,331,579 B2
(45) Date of Patent: Jun. 25, 2019

(54) UNIVERSAL SERIAL BUS (USB) SYSTEM SUPPORTING DISPLAY ALTERNATE MODE FUNCTIONALITY ON A USB TYPE-C ADAPTER

(71) Applicant: QUALCOMM Incorporated, San Diego, CA (US)

(72) Inventors: Amit Gupta, San Diego, CA (US); Michael Leung, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 15/358,986

(22) Filed: Nov. 22, 2016

(65) Prior Publication Data
US 2018/0143916 A1    May 24, 2018

(51) Int. Cl.
| G06F 13/10 | (2006.01) |
| G06F 13/42 | (2006.01) |
| G06F 1/26 | (2006.01) |
| G06F 13/38 | (2006.01) |
| G06F 13/40 | (2006.01) |

(52) U.S. Cl.
CPC ............ *G06F 13/102* (2013.01); *G06F 1/266* (2013.01); *G06F 13/385* (2013.01); *G06F 13/387* (2013.01); *G06F 13/4068* (2013.01); *G06F 13/4282* (2013.01); *G06F 2213/0042* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| 8,615,611 | B2* | 12/2013 | Hall | ...................... | G06F 13/385 |
| | | | | | 710/66 |
| 9,218,311 | B2* | 12/2015 | Kobayashi | ............. | H01R 11/00 |
| 9,798,689 | B2* | 10/2017 | Hundal | ............... | G06F 13/4247 |
| 9,952,996 | B2* | 4/2018 | Hundal | ............... | G06F 13/4022 |

(Continued)

OTHER PUBLICATIONS

'PD Alternate Mode: DisplayPort' Application Report by Texas Instruments, Nov. 2016. (Year: 2016).*

(Continued)

*Primary Examiner* — Steven G Snyder
(74) *Attorney, Agent, or Firm* — Withrow & Terranova, PLLC

(57) ABSTRACT

A Universal Serial Bus (USB) system supporting Display Alternate Mode functionality on a USB Type-C adapter is disclosed. In one aspect, a display controller in a display source device can detect a display sink device attached to a display connector of a USB Type-C split adapter and communicate a display data signal to at least three preconfigured display data pins without negotiating a pin assignment with the attached display sink device. In another aspect, the display source device can provide the display data signal to the preconfigured display data pins independent of attachment of the display sink device. By skipping the pin assignment negotiation or providing the display data signal regardless of attachment of the display sink device, it is possible to support Alternate Modes functionality without requiring a Power Delivery (PD) circuit, thus helping to reduce cost, power consumption, and implementation complexity of the display source device.

44 Claims, 9 Drawing Sheets

(56) References Cited

U.S. PATENT DOCUMENTS

| | | | | |
|---|---|---|---|---|
| 9,971,719 | B2* | 5/2018 | Pan | G06F 13/385 |
| 2011/0208980 | A1* | 8/2011 | Brooks | G06F 1/266 |
| | | | | 713/300 |
| 2013/0217274 | A1 | 8/2013 | Bar-Niv et al. | |
| 2016/0110305 | A1 | 4/2016 | Hundal et al. | |
| 2016/0127671 | A1* | 5/2016 | Hundal | G06F 13/4247 |
| | | | | 348/723 |
| 2016/0156137 | A1 | 6/2016 | Pan et al. | |
| 2016/0253283 | A1* | 9/2016 | Bowers | G06F 13/4068 |
| | | | | 710/305 |
| 2017/0194803 | A1* | 7/2017 | Card | H01R 24/20 |
| 2017/0222445 | A1* | 8/2017 | Hijazi | H02J 7/0042 |
| 2017/0293334 | A1* | 10/2017 | Pelissier | G06F 1/266 |
| 2018/0009666 | A1* | 1/2018 | Hundal | G06F 13/385 |
| 2018/0068412 | A1* | 3/2018 | Schnell | G06T 1/20 |
| 2018/0074546 | A1* | 3/2018 | DeCamp | G06F 1/1632 |
| 2018/0314662 | A1* | 11/2018 | Hundal | G06F 13/387 |

OTHER PUBLICATIONS

'USB Type-C and Power Delivery DisplayPort Alternate Mode' Technical Article by STMicroelectronics, Mar. 2018. (Year: 2018).*

International Search Report and Written Opinion for PCT/US2017/062281, dated Mar. 1, 2018, 12 pages.

Author Unknown, "Universal Serial Bus Type-C Cable and Connector Specification," USB 3.0 Promoter Group, Revision 1.2, Mar. 25, 2016, 221 pages.

Author Unknown, "VESA DisplayPort Alt Mode on USB Type-C Standard," Video Electronics Standards Association (VESA), Version 1.0a, Aug. 5, 2015, 143 pages.

Author Unknown, "VESA DisplayPort (DP) Standard," Video Electronics Standards Association (VESA), Version 1.3, Sep. 17, 2014, 754 pages.

Duda, Jacek, "Transitioning to USB Type-C with DisplayPort: Key Design Considerations," Cadence Design Systems, 2015, 5 pages.

Hayes, Caroline, "Single chip lowers USB Type-C integration costs," Analogix, Softei.com, Oct. 26, 2015, 3 pages, http://www.softei.com/single-chip-lowers-usb-type-c-integration-costs/.

Sadat, Anwar, "Low-cost implementation of USB Type-C™," Texas Instruments, Jul. 2015, 8 pages.

Author Unknown, "Battery Charging Specification," USB Implementers Forum, Inc., Revision 1.2, Dec. 7, 2010, 71 pages.

Author Unknown, "Universal Serial Bus Power Delivery Specification," USB Implementers Forum, Revision 3.0, Version 1.0a, Mar. 25, 2016, 513 pages.

Second Written Opinion for PCT/US2017/062281, dated Oct. 18, 2018, 5 pages.

International Preliminary Report on Patentability for PCT/US2017/062281, dated Feb. 8, 2019, 6 pages.

* cited by examiner

FIG. 4A

Connector 400 (308, 310, 312):

| A12 | A11 | A10 | A9 | A8 | A7 | A6 | A5 | A4 | A3 | A2 | A1 |
|---|---|---|---|---|---|---|---|---|---|---|---|
| GND | RX2+ | RX2- | VBUS | SBU1 | D- | D+ | CC | VBUS | TX1- | TX1+ | GND |
| GND | TX2+ | TX2- | VBUS | VCONN |  |  | SBU2 | VBUS | RX1- | RX1+ | GND |
| B1 | B2 | B3 | B4 | B5 | B6 | B7 | B8 | B9 | B10 | B11 | B12 |

402, 404: A10–A11, B2–B3, A2–A3, B10–B11
406, 408: A6–A7, B6–B7
410, 412: A9, A4, B4, B9
(SBU1 A8; CC A5; SBU2 B8; VCONN B5)

FIG. 4B

Connector 414 (316, 320, 324):

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBUS | CC1 | D+ | D- | SBU1 | VBUS | RX2- | RX2+ | GND |
| GND | RX1+ | RX1- | VBUS | SBU2 | D- | D+ | CC2 | VBUS | TX2- | TX2+ | GND |
| B12 | B11 | B10 | B9 | B8 | B7 | B6 | B5 | B4 | B3 | B2 | B1 |

416, 418: A2–A3, B10–B11, A10–A11, B2–B3
420, 422: A6–A7, B6–B7
424, 426: A4, A9, B4, B9

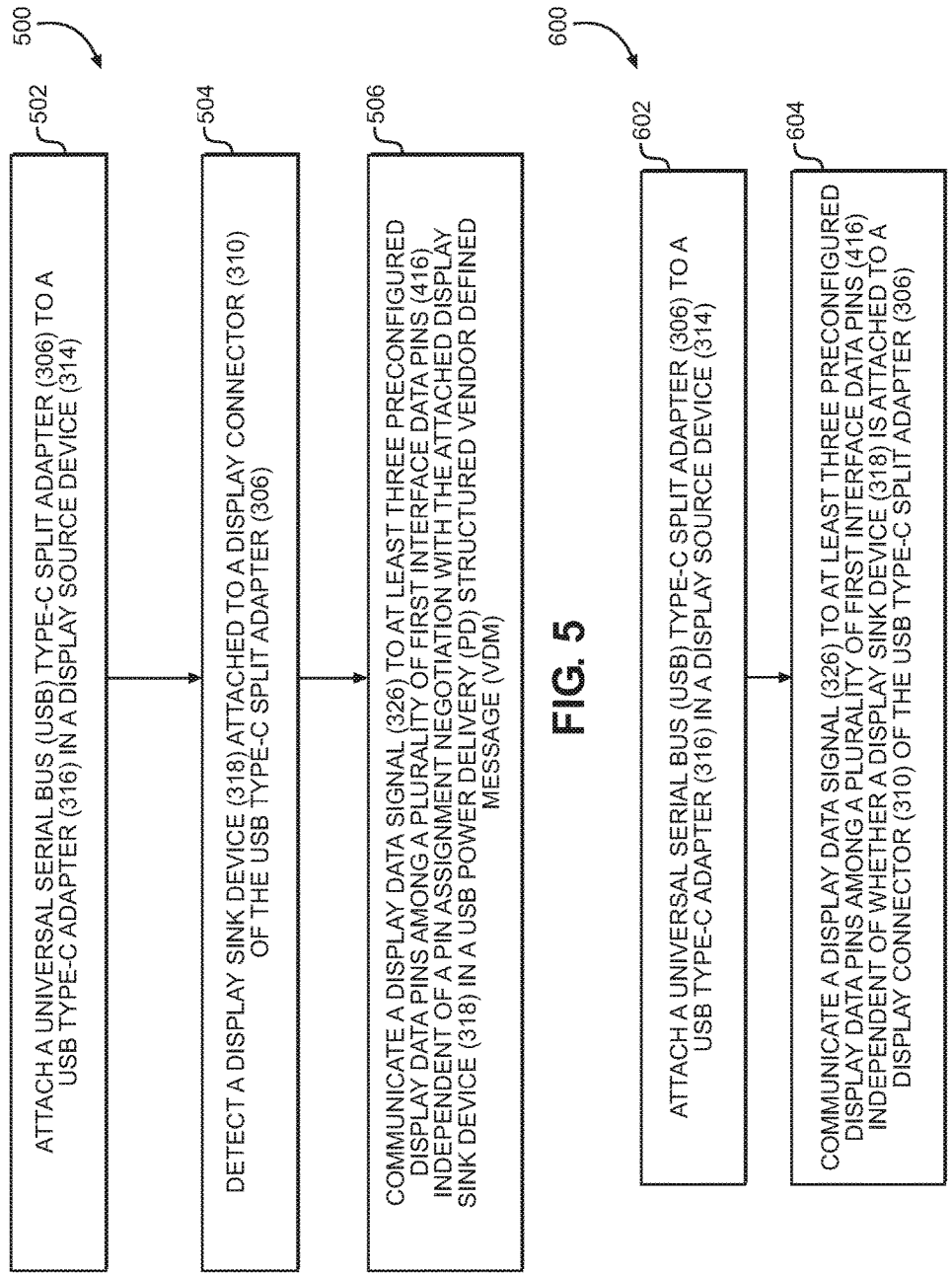

UNIVERSAL SERIAL BUS (USB) SYSTEM SUPPORTING DISPLAY ALTERNATE MODE FUNCTIONALITY ON A USB TYPE-C ADAPTER

BACKGROUND

I. Field of the Disclosure

The technology of the disclosure relates generally to Universal Serial Bus (USB).

II. Background

Mobile communication devices have become increasingly common in current society. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences.

Peripheral devices, such as portable flash drives, audio speakers, display monitors, and chargers, are often attached to the mobile communication devices for convenience and/ or necessity reasons. A universal serial bus (USB) interface is an increasingly popular standard interface to connect such peripherals both outside and inside the mobile communication devices. When a peripheral device is connected to a mobile communication device via the USB interface, the peripheral device may be a USB client and the mobile communication device may act as a USB host, and vice versa.

Over the years, USB interfaces for connecting the USB host and the USB client have evolved from bulkier legacy Type-A and Type A/B interfaces to the miniaturized Type-B and Type-C interfaces. The USB Type-C interface is created especially for mobile communication devices that tend to have smaller, thinner, and lighter form factors. The USB Type-C interface enables a variety of new connectivity possibilities while retaining all of the functional benefits of the legacy USB interfaces. As such, the USB Type-C interface also inherited the point-to-point connection topology from the legacy USB interfaces. An external USB hub is typically needed in a USB system to connect a USB host with multiple USB device clients. Such an external USB hub typically consumes more electrical power than the mobile communication devices, which typically act as the USB host, can provide. As a result, the external USB hub often needs to be attached to an electrical power source (e.g., wall outlet) to function, thus limiting mobility of the mobile communication devices and increasing costs for end users.

SUMMARY OF THE DISCLOSURE

Aspects disclosed in the detailed description include a Universal Serial Bus (USB) system supporting Display Alternate Mode functionality on a USB Type-C adapter. A USB Type-C split adapter, which provides a USB Type-C connector on one end and a display connector and a USB Revision 2.0 (USB 2.0) connector on an opposite end, is connected to a USB Type-C adapter of a display source device. In one aspect, a display controller in the display source device can detect a display sink device attached to the display connector of the USB Type-C split adapter. The display source device then communicates a display data signal to at least three preconfigured display data pins in the USB Type-C adapter without negotiating a pin assignment with the attached display sink device in a USB Power Delivery (PD) Structured Vendor Defined Message (VDM). In another aspect, the display source device can be configured to provide the display data signal to the preconfigured display data pins independent of whether the display connector is attached to the display sink device. By skipping the pin assignment negotiation with the attached display sink device or providing the display data signal regardless of attachment of the display sink device, it is possible to support Display Alternate Mode functionality without requiring a PD circuit, thus helping to reduce cost, power consumption, and implementation complexity of the display source device.

In this regard, in one aspect, a USB system is provided. The USB system includes a USB Type-C split adapter. The USB Type-C split adapter includes a USB Type-C connector including a plurality of first data pins and a plurality of second data pins. The USB Type-C split adapter also includes a display connector including a plurality of display data pins conductively coupled to the plurality of first data pins in the USB Type-C connector, respectively. The USB Type-C split adapter also includes a USB 2.0 connector including a plurality of USB 2.0 data pins conductively coupled to the plurality of second data pins in the USB Type-C connector, respectively. The USB system also includes a display source device. The display source device includes a USB Type-C adapter. The USB Type-C adapter includes a plurality of first interface data pins conductively coupled to the plurality of first data pins in the USB Type-C connector, respectively. The USB Type-C adapter also includes a plurality of second interface data pins conductively coupled to the plurality of second data pins in the USB Type-C connector, respectively. The display source device also includes a display controller. The display controller is configured to detect a display sink device attached to the display connector. The display controller is also configured to communicate a display data signal to at least three preconfigured display data pins among the plurality of first interface data pins independent of a pin assignment negotiation with the attached display sink device in a USB PD Structured VDM.

In another aspect, a USB system is provided. The USB system includes a USB Type-C split adapter. The USB Type-C split adapter includes a USB Type-C connector including a plurality of first data pins and a plurality of second data pins. The USB Type-C split adapter also includes a display connector including a plurality of display data pins conductively coupled to the plurality of first data pins in the USB Type-C connector, respectively. The USB Type-C split adapter also includes a USB 2.0 connector including a plurality of USB 2.0 data pins conductively coupled to the plurality of second data pins in the USB Type-C connector, respectively. The USB system also includes a means for providing a display data signal. The means for providing a display data signal includes a means for interfacing with the USB Type-C connector. The means for interfacing with the USB Type-C connector includes a plurality of first interface data pins conductively coupled to the plurality of first data pins in the USB Type-C connector, respectively. The means for interfacing with the USB Type-C connector also includes a plurality of second interface data pins conductively coupled to the plurality of second data pins in the USB Type-C connector, respectively. The means for providing a display data signal also includes a means for controlling the display data signal. The means for controlling the display data signal is configured to detect a display sink device attached to the display connector. The means for controlling the display data signal is also configured to communicate the display data signal to at least three preconfigured display data pins among the plurality of first interface data pins independent of a pin assignment negotiation with the attached display sink device in a USB PD Structured VDM.

In another aspect, a method for communicating a display data signal over a USB Type-C adapter is provided. The method includes attaching a USB Type-C split adapter to a USB Type-C adapter in a display source device. The USB Type-C split adapter includes a USB Type-C connector including a plurality of first data pins and a plurality of second data pins. The USB Type-C split adapter also includes a display connector including a plurality of display data pins conductively coupled to the plurality of first data pins in the USB Type-C connector, respectively. The USB Type-C split adapter also includes a USB 2.0 connector including a plurality of USB 2.0 data pins conductively coupled to the plurality of second data pins in the USB Type-C connector, respectively. The USB Type-C adapter includes a plurality of first interface data pins conductively coupled to the plurality of first data pins in the USB Type-C connector, respectively. The USB Type-C adapter also includes a plurality of second interface data pins conductively coupled to the plurality of second data pins in the USB Type-C connector, respectively. The method also includes detecting a display sink device attached to the display connector of the USB Type-C split adapter. The method also includes communicating a display data signal to at least three preconfigured display data pins among the plurality of first interface data pins independent of a pin assignment negotiation with the attached display sink device in a USB PD Structured VDM.

In another aspect, a USB system is provided. The USB system includes a USB Type-C split adapter. The USB Type-C split adapter includes a USB Type-C connector including a plurality of first data pins and a plurality of second data pins. The USB Type-C split adapter also includes a display connector including a plurality of display data pins conductively coupled to the plurality of first data pins in the USB Type-C connector, respectively. The USB Type-C split adapter also includes a USB 2.0 connector including a plurality of USB 2.0 data pins conductively coupled to the plurality of second data pins in the USB Type-C connector, respectively. The USB system also includes a display source device. The display source device includes a USB Type-C adapter. The USB Type-C adapter includes a plurality of first interface data pins conductively coupled to the plurality of first data pins in the USB Type-C connector, respectively. The USB Type-C adapter also includes a plurality of second interface data pins conductively coupled to the plurality of second data pins in the USB Type-C connector, respectively. The USB system also includes a display controller. The display controller is configured to communicate a display data signal to at least three preconfigured display data pins among the plurality of first interface data pins independent of whether a display sink device is attached to the display connector.

In another aspect, a USB system is provided. The USB system includes a USB Type-C split adapter. The USB Type-C split adapter includes a USB Type-C connector including a plurality of first data pins and a plurality of second data pins. The USB Type-C split adapter also includes a display connector including a plurality of display data pins conductively coupled to the plurality of first data pins in the USB Type-C connector, respectively. The USB Type-C split adapter also includes a USB 2.0 connector including a plurality of USB 2.0 data pins conductively coupled to the plurality of second data pins in the USB Type-C connector, respectively. The USB system also includes a means for providing a display data signal. The means for providing a display data signal includes a means for interfacing with the USB Type-C connector. The means for interfacing with the USB Type-C connector includes a plurality of first interface data pins conductively coupled to the plurality of first data pins in the USB Type-C connector, respectively. The means for interfacing with the USB Type-C connector also includes a plurality of second interface data pins conductively coupled to the plurality of second data pins in the USB Type-C connector, respectively. The means for providing a display data signal also includes a means for controlling the display data signal configured to communicate the display data signal to at least three preconfigured display data pins among the plurality of first interface data pins independent of whether a display sink device is attached to the display connector.

In another aspect, a method for communicating a display data signal over a USB Type-C adapter is provided. The method includes attaching a USB Type-C split adapter to a USB Type-C adapter in a display source device. The USB Type-C split adapter includes a USB Type-C connector including a plurality of first data pins and a plurality of second data pins. The USB Type-C split adapter also includes a display connector including a plurality of display data pins conductively coupled to the plurality of first data pins in the USB Type-C connector, respectively. The USB Type-C split adapter also includes a USB 2.0 connector including a plurality of USB 2.0 data pins conductively coupled to the plurality of second data pins in the USB Type-C connector, respectively. The USB Type-C adapter includes a plurality of first interface data pins conductively coupled to the plurality of first data pins in the USB Type-C connector, respectively. The USB Type-C adapter also includes a plurality of second interface data pins conductively coupled to the plurality of second data pins in the USB Type-C connector, respectively. The method also includes communicating a display data signal to at least three preconfigured display data pins among the plurality of first interface data pins independent of whether a display sink device is attached to the display connector of the USB Type-C split adapter.

In another aspect, a USB system is provided. The USB system includes a USB Type-C split adapter. The USB Type-C split adapter includes a USB Type-C connector including a plurality of first data pins and a plurality of second data pins. The USB Type-C split adapter also includes a display connector including a plurality of display data pins conductively coupled to the plurality of first data pins in the USB Type-C connector, respectively. The USB Type-C split adapter also includes a USB 2.0 connector including a plurality of USB 2.0 data pins conductively coupled to the plurality of second data pins in the USB Type-C connector, respectively. The USB system also includes a display sink device including a display connector interface. The display connector interface includes a plurality of display interface data pins conductively coupled to the plurality of display data pins in the display connector, respectively. The USB system also includes a display source device. The display source device includes a USB Type-C adapter. The USB Type-C adapter includes a plurality of first interface data pins conductively coupled to the plurality of first data pins in the USB Type-C connector, respectively. The USB Type-C adapter also includes a plurality of second interface data pins conductively coupled to the plurality of second data pins in the USB Type-C connector, respectively. The display source device also includes a display controller. The display controller is configured to detect the display sink device attached to the display connector. The display controller is also configured to communicate a display data signal to at least three preconfigured display data pins among the plurality of first interface data pins independent of a pin assignment negotiation with the attached display sink device in a USB PD Structured VDM.

In another aspect, a USB system is provided. The USB system includes a USB Type-C split adapter. The USB Type-C split adapter includes a USB Type-C connector including a plurality of first data pins and a plurality of second data pins. The USB Type-C split adapter also includes a display connector including a plurality of display data pins conductively coupled to the plurality of first data pins in the USB Type-C connector, respectively. The USB Type-C split adapter also includes a USB 2.0 connector including a plurality of USB 2.0 data pins conductively coupled to the plurality of second data pins in the USB Type-C connector, respectively. The USB system also includes a display sink device including a display connector interface. The display connector interface includes a plurality of display interface data pins conductively coupled to the plurality of display data pins in the display connector, respectively. The USB system also includes a display source device. The display source device includes a USB Type-C adapter. The USB Type-C adapter includes a plurality of first interface data pins conductively coupled to the plurality of first data pins in the USB Type-C connector, respectively. The USB Type-C adapter also includes a plurality of second interface data pins conductively coupled to the plurality of second data pins in the USB Type-C connector, respectively. The display source device also includes a display controller configured to communicate a display data signal to at least three preconfigured display data pins among the plurality of first interface data pins independent of whether the display sink device is attached to the display connector.

In another aspect, a USB Type-C split adapter is provided. The USB Type-C split adapter includes a USB Type-C connector including a plurality of first data pins, a plurality of second data pins, and at least one power pin. The USB Type-C split adapter also includes a display connector including a plurality of display data pins. The USB Type-C split adapter also includes a USB 2.0 connector including a plurality of USB 2.0 data pins and at least one USB 2.0 power pin. The USB Type-C split adapter also includes a cable splitter coupled to the USB Type-C connector over a Type-C cable section, to the display connector over a display device cable section, and to the USB 2.0 connector over a USB 2.0 device cable section. The Type-C cable section includes at least four first conductive wires coupled to at least four first data pins among the plurality of first data pins. The Type-C cable section also includes a plurality of second conductive wires coupled to the plurality of second data pins, respectively. The Type-C cable section also includes at least one third conductive wire coupled to the at least one power pin. The display device cable section includes at least four display device conductive wires configured to couple the at least four first conductive wires to at least four display data pins among the plurality of display data pins, respectively. The USB 2.0 device cable section includes a plurality of first USB 2.0 device conductive wires configured to couple the plurality of second conductive wires to the plurality of USB 2.0 data pins, respectively. The USB 2.0 device cable section also includes at least one second USB 2.0 device conductive wire configured to couple the at least one third conductive wire to the at least one USB 2.0 power pin.

In another aspect, a USB system is provided. The USB system includes a USB Type-C split adapter. The USB Type-C split adapter includes a USB Type-C connector including a plurality of first data pins and a plurality of second data pins. The USB Type-C split adapter also includes a display connector including a plurality of display data pins conductively coupled to the plurality of first data pins in the USB Type-C connector, respectively. The USB Type-C split adapter also includes a USB 2.0 connector including a plurality of USB 2.0 data pins conductively coupled to the plurality of second data pins in the USB Type-C connector, respectively. The USB Type-C split adapter also includes a dongle-side PD circuit. The USB system also includes a display source device. The display source device includes a PD circuit and a USB Type-C adapter. The USB Type-C adapter includes a plurality of first interface data pins conductively coupled to the plurality of first data pins in the USB Type-C connector, respectively. The USB Type-C adapter also includes a plurality of second interface data pins conductively coupled to the plurality of second data pins in the USB Type-C connector, respectively. The USB Type-C adapter also includes a bypass switch configured to enable and disable the dongle-side PD circuit. The dongle-side PD circuit is configured to communicate a USB PD Structured VDM with the PD circuit when the dongle-side PD circuit is enabled.

BRIEF DESCRIPTION OF THE FIGURES

FIG. 4A is a schematic diagram of an exemplary USB Type-C plug (front view) as defined in USB Type-C Cable and Connector Specification, Release 1.2 (Type-C Specification);

FIG. 4B is a schematic diagram of an exemplary USB Type-C receptacle (front view) as defined in the Type-C Specification of FIG. 4A;

FIG. 5 is a flowchart of an exemplary process that can be employed by a display controller for communicating a display data signal over the USB Type-C split adapter of FIG. 3;

FIG. 6 is a flowchart of an exemplary process that can be employed by a display controller for communicating a display data signal over the USB Type-C split adapter of FIG. 3 independent of a display sink device;

DETAILED DESCRIPTION

Figure 1:
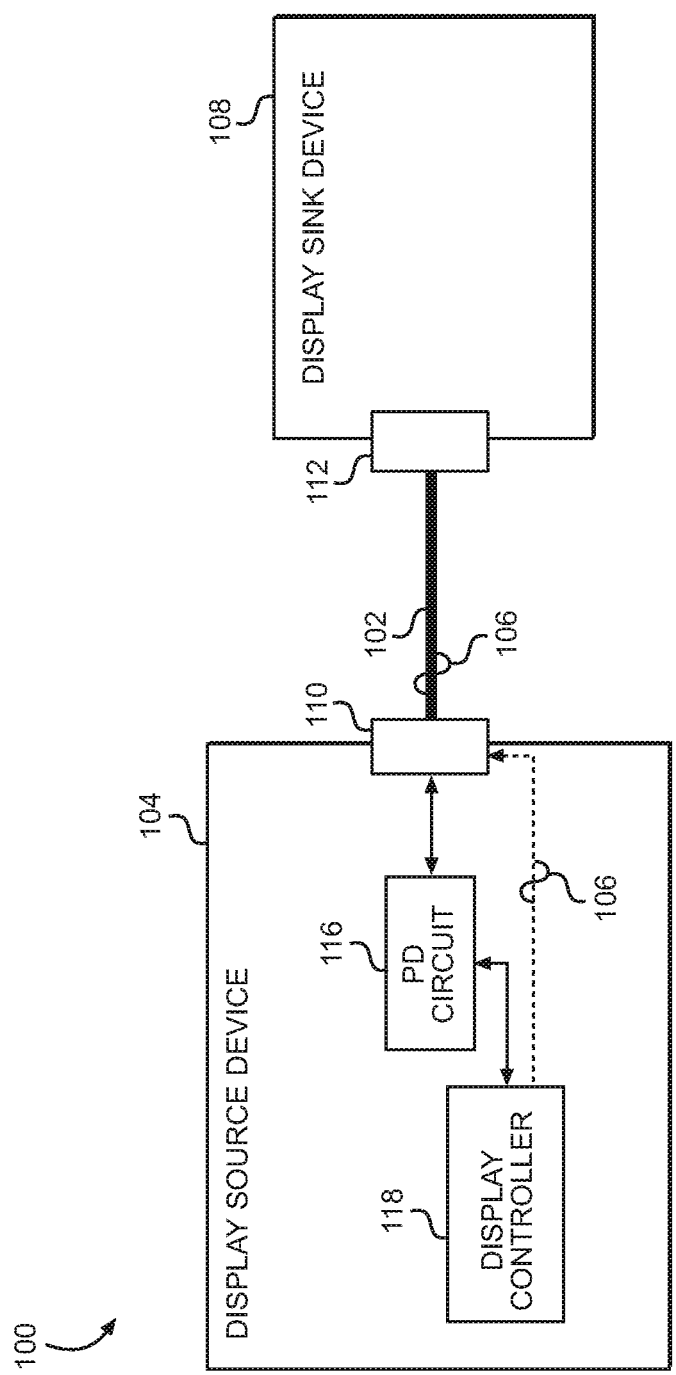
FIG. 1 is a schematic diagram of an exemplary conventional Universal Serial Bus (USB) system configured to support Alternate Modes based on a traditional Type-C cable.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include a Universal Serial Bus (USB) system supporting Display Alternate Mode functionality on a USB Type-C adapter. A USB Type-C split adapter, which provides a USB Type-C connector on one end and a display connector and a USB Revision 2.0 (USB 2.0) connector on an opposite end, is connected to a USB Type-C adapter of a display source device. In one aspect, a display controller in the display source device can detect a display sink device attached to the display connector of the USB Type-C split adapter. The display source device then communicates a display data signal to at least three preconfigured display data pins in the USB Type-C adapter without negotiating a pin assignment with the attached display sink device in a USB Power Delivery (PD) Structured Vendor Defined Message (VDM). In another aspect, the display source device can be configured to provide the display data signal to the preconfigured display data pins independent of whether the display connector is attached to the display sink device. By skipping the pin assignment negotiation with the attached display sink device or providing the display data signal regardless of attachment of the display sink device, it is possible to support Display Alternate Mode functionality without requiring a PD circuit, thus helping to reduce cost, power consumption, and implementation complexity of the display source device.

Figure 2:
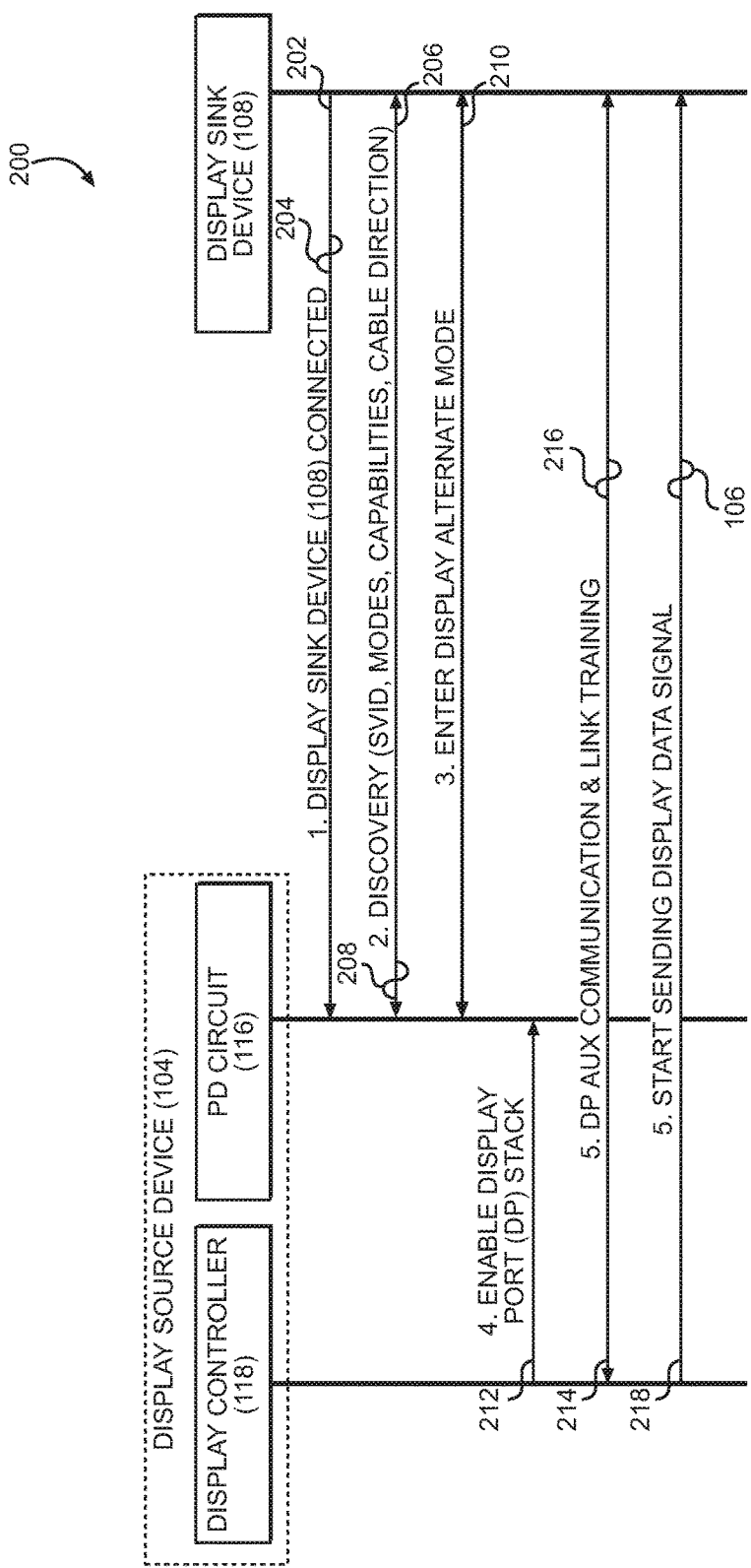
FIG. 2 is a signal flow diagram of an exemplary process for configuring a display source device in the conventional USB system of FIG. 1 to distribute a display data signal to a display sink device over the traditional Type-C cable.

Before discussing exemplary aspects of a USB system supporting Alternate Modes based on a USB Type-C split adapter that include specific aspects of the present disclosure, a brief overview of a conventional USB system configured to support Alternate Modes based on a traditional Type-C cable and a process for enabling the Alternate Modes in the conventional USB system are first provided in FIGS. 1 and 2, respectively. The discussion of specific exemplary aspects of the USB system supporting Alternate Modes based on the USB Type-C split adapter starts below with reference to FIG. 3.

In this regard, FIG. 1 is a schematic diagram of an exemplary conventional USB system 100 configured to support Alternate Modes based on a traditional Type-C cable 102. According to the USB Type-C Cable and Connector Specification, Release 1.2, published on Mar. 25, 2016 (hereinafter "Type-C Specification"), the Alternate Modes refer to operations defined by a vendor or standards organization for a USB device. One of the Alternate Modes, which is referred to as Display Alternate Mode hereinafter, enables a display source device 104 (e.g. a smart phone, a tablet, etc.) to distribute a display data signal 106 to a display sink device 108 (e.g., a monitor) over a Display Alternate Mode connection (e.g., the traditional Type-C cable 102). The traditional Type-C cable 102 is connected to the display source device 104 and the display sink device 108 via a source device Type-C interface 110 and a sink device Type-C interface 112, respectively. The source device Type-C interface 110 and the sink device Type-C interface 112 include respective conductive pins coupled to the traditional Type-C cable 102.

Prior to distributing the display data signal 106 to the display sink device 108 over the traditional Type-C cable 102, the display source device 104 negotiates with the display sink device 108 for specific pin assignment in the source device Type-C interface 110 and the sink device Type-C interface 112. According to the Type-C Specification, such pin assignment negotiation can only be performed using USB PD Structured VDM commands. As such, the display source device 104 includes a PD circuit 116 for supporting the USB PD Structured VDM commands and a display controller 118 for providing the display data signal 106 to the source device Type-C interface 110.

The display source device 104 can be configured to distribute the display data signal 106 to the display sink device 108 based on a process. In this regard, FIG. 2 is a signal flow diagram of an exemplary process 200 for configuring the display source device 104 of FIG. 1 to distribute the display data signal 106 to the display sink device 108 over the traditional Type-C cable 102.

With reference to FIG. 2, at step 202, the PD circuit 116 receives an indication signal 204 when the display sink device 108 is attached to the traditional Type-C cable 102 via the sink device Type-C interface 112. In response to receiving the indication signal 204, at step 206, the PD circuit 116 exchanges one or more USB PD Structured VDMs 208 for setting up the Display Alternate Mode between the display source device 104 and the display sink device 108. The USB PD Structured VDMs 208 may include such information as Standard or Vendor Identification (SVID), modes, capabilities, and cable direction, etc. Next, at step 210, the display source device 104 and the display sink device 108 enter the Display Alternate Mode. Subsequently at step 212, the display controller 118 enables a display port (DP) software stack for processing and distributing the display data signal 106 to the display sink device 108. At step 214, the display controller 118 and the display sink device 108 exchange one or more DP auxiliary communication and link training signals 216. Subsequently, at step 218, the display controller 118 distributes the display data signal 106 to the display sink device 108 over the traditional Type-C cable 102.

With reference back to FIG. 1, the PD circuit 116 configured to set up the Display Alternate Mode between the display source device 104 and the display sink device 108 can add significant cost to the display source device 104. In addition, the DP software stack required for processing and distributing the display data signal 106 can add complexity to software design and implementation. Furthermore, the traditional Type-C cable 102 can only support one point-to-point operation at a given time. For example, when the traditional Type-C cable 102 is used to support the Display Alternate Mode between the display source device 104 and the display sink device 108, it may be impossible to support a USB Revision 2.0 (USB 2.0) connection, also known as USB Super Speed connection, between the display source device 104 and a USB 2.0 device (e.g., a laptop, a charger, etc.) concurrently. As such, it may be desired to support the Display Alternate Mode without requiring the PD circuit 116 and the DP software stack. Further, it may also be desired to be able to support concurrently the Display Alternate Mode and the USB 2.0 connection based on a single Type-C cable.

Figure 3:
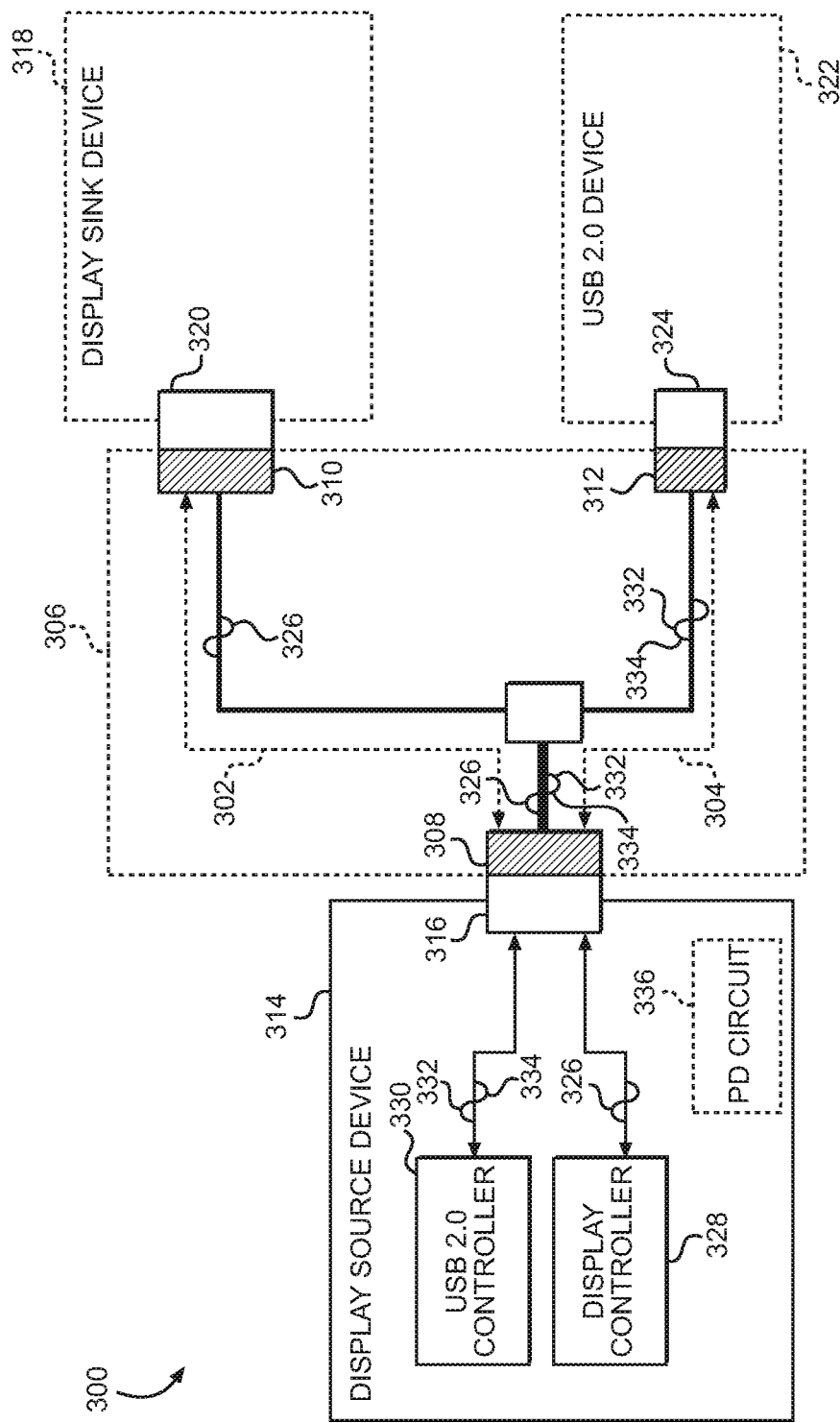
FIG. 3 is a schematic diagram of an exemplary USB system configured to support a Display Alternate Mode connection and/or a USB Revision 2.0 (USB 2.0) connection over a USB Type-C split adapter.

In this regard, FIG. 3 is a schematic diagram of an exemplary USB system 300 configured to support a Display Alternate Mode connection 302 and/or a USB 2.0 connection 304 over a USB Type-C split adapter 306. In an exemplary aspect, the USB Type-C split adapter 306 is a USB Type-C split cable. In one non-limiting example, the Display Alternate Mode connection 302 is configured to support Display Alternate Mode functionalities as defined in the Type-C Specification. In another non-limiting example, the Display Alternate Mode connection 302 is configured to support Display Alternate Mode equivalent functionalities, which can differ from the Display Alternate Mode functionalities defined in the Type-C Specification. The USB Type-C split adapter 306 includes a USB Type-C connector 308 on one end, and a display connector 310 and a USB 2.0 connector 312 on an opposite end. The USB system 300 includes a display source device 314 having a USB Type-C adapter 316 for connecting to the USB Type-C connector 308 of the USB Type-C split adapter 306. The display source device 314 may be configured to provide a means for providing a display data signal. The USB Type-C adapter 316 may be configured to provide a means for interfacing with the USB Type-C connector 308. The USB system 300 may include a display sink device 318, which has a display connector interface 320 for attachment to the display connector 310 of the USB Type-C split adapter 306. The USB system 300 may also include a USB 2.0 device 322, which has a USB 2.0 connector interface 324 for attachment to the USB 2.0 connector 312 of the USB Type-C split adapter 306. As such, the display source device 314 can support the Display Alternate Mode connection 302 and the USB 2.0 connection 304 concurrently over the USB Type-C split adapter 306. Specific pin layout of the USB Type-C adapter 316, the display connector interface 320, and the USB 2.0 connector interface 324 will be further discussed with reference to FIGS. 4A and 4B.

To set up the Display Alternate Mode connection 302 for distributing a display data signal 326 without relying on a PD circuit (e.g., the PD circuit 116 of FIG. 1), the display source device 314 can be configured to skip the steps 202, 206, 210, and 212 of the process 200 of FIG. 2. Instead of negotiating pin assignment for the Display Alternate Mode using the USB PD Structured VDM commands, the display source device 314 and the display sink device 318 may be configured to communicate the display data signal 326 via preconfigured display data pins in both the USB Type-C adapter 316 and the display connector interface 320. Further discussion of the preconfigured display data pins will be provided in reference to FIGS. 4A and 4B. By eliminating the process steps that rely on the PD circuit, it is possible to support the Display Alternate Mode without the PD circuit, thus helping to reduce cost, power consumption, and implementation complexity of the display source device 314.

In a non-limiting example, the USB Type-C adapter 316 and the display connector interface 320 are USB Type-C receptacles. Accordingly, the USB Type-C connector 308 and the display connector 310 are USB Type-C plugs. Specific pin layout of the USB Type-C receptacles and the USB Type-C plugs are discussed next according to definitions of the Type-C Specification.

In this regard, FIG. 4A is a schematic diagram of an exemplary USB Type-C plug 400 (front view) as defined in the Type-C Specification. Elements of FIG. 3 are referenced in connection with FIG. 4A and will not be re-described herein. In a non-limiting example, the USB Type-C plug 400 can be provided as the USB Type-C connector 308 and the display connector 310 of the USB Type-C split adapter 306. The USB Type-C plug 400 may also be provided as the USB 2.0 connector 312 of the USB Type-C split adapter 306.

The USB Type-C plug 400 includes twenty-four pins that are labeled from A1 to A12 and B1 to B12. The pins A1 to A12 are disposed from right to left, while the pins B1 to B12 are disposed from left to right. Among the twenty-four pins, pins A4, A9, B4, and B9 are bus power ($V_{BUS}$) pins. Pin A5 is a configuration channel (CC) pin. Pins A2, A3, B2, and B3 are Super Speed data transmit (TX) pins. Pins A10, A11, B10, and B11 are Super Speed data receive (RX) pins. Pins A6 and A7 are USB 2.0 High Speed data pins. Pins A8 and B8 provide at least one sideband use (SBU) pin. Additionally, pins A1, A12, B1, and B12 provide at least one return current path (GND) pin. Pins B6 and B7 are unused.

Collectively, the Super Speed data TX pins A2, A3, B2, and B3 and the Super Speed data RX pins A10, A11, B10, and B11 constitute a plurality of first data pins 402 in the USB Type-C connector 308 and a plurality of display data pins 404 in the display connector 310 of the USB Type-C split adapter 306. In this regard, the USB Type-C connector 308 has eight first data pins 402 and the display connector 310 has eight display data pins 404. The USB 2.0 High Speed data pins A6 and A7 constitute collectively a plurality of second data pins 406 in the USB Type-C connector 308 and a plurality of USB 2.0 data pins 408 in the USB 2.0 connector 312 of the USB Type-C split adapter 306. The $V_{BUS}$ pins A4, A9, B4, and B9 constitute collectively at least one power pin 410 in the USB Type-C connector 308 and at least one USB 2.0 power pin 412 in the USB 2.0 connector 312. Conductive coupling between the first data pins 402 and the display data pins 404, and between the second data pins 406 and the USB 2.0 data pins 408 will be further discussed later in FIG. 8.

FIG. 4B is a schematic diagram of an exemplary USB Type-C receptacle 414 (front view) as defined in the Type-C Specification. Elements of FIGS. 3 and 4A are referenced in connection with FIG. 4B and will not be re-described herein. In a non-limiting example, the USB Type-C receptacle 414 can be provided in the display source device 314 as the USB Type-C adapter 316 and in the display sink device 318 as the display connector interface 320. The USB Type-C receptacle 414 may also be provided in the USB 2.0 device 322 as the USB 2.0 connector interface 324.

The USB Type-C receptacle 414 also includes twenty-four pins that are labeled from A1 to A12 and B1 to B12. In contrast to the USB Type-C plug 400, the pins A1 to A12 are disposed from left to right, while the pins B1 to B12 are disposed from right to left. Among the twenty-four pins, pins A4, A9, B4, and B9 are $V_{BUS}$ pins that correspond respectively to the $V_{BUS}$ pins A9, A4, B9, and B4 in the USB Type-C plug 400. CC pins A5 and B5 correspond respectively to the SBU pins A8 and B8 in the USB Type-C plug 400. Pins A6 and A7 are USB 2.0 High Speed data pins and correspond respectively to the USB 2.0 High Speed data pins A7 and A6 in the USB Type-C plug 400. Super Speed data TX pins A2, A3, B2, and B3 correspond respectively to the Super Speed data RX pins A11, A10, B11, and B10 in the USB Type-C plug 400. Super Speed data RX pins A10, A11, B10, and B11 correspond respectively to the Super Speed data TX pins A3, A2, B3, and B2 in the USB Type-C plug 400. Pins B6 and B7 are the same USB 2.0 High Speed data pins as the pins A6 and A7 in the USB Type-C plug 400.

Collectively, the Super Speed data TX pins A2, A3, B2, and B3 and the Super Speed data RX pins A10, A11, B10, and B11 constitute a plurality of first interface data pins 416 in the USB Type-C adapter 316 and a plurality of display interface data pins 418 in the display connector interface

320. In this regard, the USB Type-C adapter 316 has eight first interface data pins 416 and the display connector interface 320 has eight display interface data pins 418. The pins A6, A7, B6, and B7 constitute collectively a plurality of second interface data pins 420 in the USB Type-C adapter 316 of the display source device 314 and a plurality of USB 2.0 interface data pins 422 in the USB 2.0 connector interface 324 of the USB 2.0 device 322. The $V_{BUS}$ pins A4, A9, B4, and B9 constitute collectively at least one interface power pin 424 in the USB Type-C adapter 316 and at least one USB 2.0 interface power pin 426 in the USB 2.0 connector interface 324.

When the USB Type-C connector 308 of the USB Type-C split adapter 306 is plugged into the USB Type-C adapter 316 of the display source device 314, the first interface data pins 416 in the USB Type-C adapter 316 are conductively coupled to the first data pins 402 in the USB Type-C connector 308. In addition, the second interface data pins 420 in the USB Type-C adapter 316 are conductively coupled to the second data pins 406 in the USB Type-C connector 308. Further, the interface power pin 424 in the USB Type-C adapter 316 is conductively coupled to the power pin 410 in the USB Type-C connector 308.

When the display connector 310 of the USB Type-C split adapter 306 is plugged into the display connector interface 320 of the display sink device 318, the display interface data pins 418 in the display connector interface 320 are conductively coupled to the display data pins 404 in the display connector 310. When the USB 2.0 connector 312 of the USB Type-C split adapter 306 is plugged into the USB 2.0 connector interface 324 of the USB 2.0 device 322, the USB 2.0 interface data pins 422 in the USB 2.0 connector interface 324 are conductively coupled to the USB 2.0 data pins 408 in the USB 2.0 connector 312. In addition, the USB 2.0 interface power pin 426 in the USB 2.0 connector interface 324 is conductively coupled to the USB 2.0 power pin 412 in the USB 2.0 connector 312.

With reference back to FIG. 3, as previously stated, the display source device 314 and the display sink device 318 may be configured to communicate the display data signal 326 via preconfigured display data pins in both the USB Type-C adapter 316 and the display connector interface 320. In a first non-limiting example, the display source device 314 can be configured to distribute the display data signal 326 to the display sink device 318 via at least three preconfigured display data pins among the first interface data pins 416 in the USB Type-C adapter 316. Accordingly, the display sink device 318 can be configured to receive the display data signal 326 via the three preconfigured display data pins among the display interface data pins 418. In this regard, the Display Alternate Mode connection 302 includes one data lane formed by the three preconfigured display data pins.

In a second non-limiting example, the display source device 314 can be configured to distribute the display data signal 326 to the display sink device 318 via at least four preconfigured display data pins among the first interface data pins 416 in the USB Type-C adapter 316. Accordingly, the display sink device 318 can be configured to receive the display data signal 326 via the four preconfigured display data pins among the display interface data pins 418. In this regard, the Display Alternate Mode connection 302 includes two data lanes formed by the four preconfigured display data pins.

In a third non-limiting example, the display source device 314 can be configured to distribute the display data signal 326 to the display sink device 318 via at least six preconfigured display data pins among the first interface data pins 416 in the USB Type-C adapter 316. Accordingly, the display sink device 318 can be configured to receive the display data signal 326 via the six preconfigured display data pins among the display interface data pins 418. In this regard, the Display Alternate Mode connection 302 includes three data lanes formed by the six preconfigured display data pins.

In a fourth non-limiting example, the display source device 314 can be configured to distribute the display data signal 326 to the display sink device 318 via eight preconfigured display data pins among the first interface data pins 416 in the USB Type-C adapter 316. Accordingly, the display sink device 318 can be configured to receive the display data signal 326 via the eight preconfigured display data pins among the display interface data pins 418. In this regard, the Display Alternate Mode connection 302 includes four data lanes formed by the eight preconfigured display data pins.

With continuing reference to FIG. 3, the display source device 314 includes a display controller 328 and a USB controller 330 configured to control the Display Alternate Mode connection 302 and the USB 2.0 connection 304, respectively. The display controller 328 may be configured to provide a means for controlling the display data signal 326. In a non-limiting example, the display controller 328 and the USB controller 330 can be microprocessors, microcontrollers, digital signal processors, and/or general-purpose processors. The display controller 328 and the USB controller 330 may be configured to function individually or concurrently.

In one aspect, the display sink device 318 is attached to the display connector 310 of the USB Type-C split adapter 306 via the display connector interface 320. In this regard, the display controller 328 may be configured to detect the attached display sink device 318 via a preconfigured sink device detection pin among the first interface data pins 416 in the USB Type-C adapter 316. In response to detecting the attached display sink device 318, the display controller 328 distributes the display data signal 326 to the preconfigured display data pins (e.g., three, four, six, or eight preconfigured display data pins) among the first interface data pins 416 of FIG. 3B. Because both the display source device 314 and the display sink device 318 are configured to use the same preconfigured display data pins, the display controller 328 can communicate the display data signal 326 to preconfigured display data pins independent of pin assignment negotiation with the attached display sink device 318 in the USB PD Structured VDM. Accordingly, the display sink device 318 can receive the display data signal 326 via the preconfigured display data pins among the display interface data pins 418 of FIG. 3B.

The display controller 328 may be configured to communicate the display data signal 326 according to a process. In this regard, FIG. 5 is a flowchart of an exemplary process 500 that can be employed by the display controller 328 for communicating the display data signal 326 over the USB Type-C split adapter 306.

With reference to FIG. 5, the USB Type-C split adapter 306 is attached to the USB Type-C adapter 316 in the display source device 314 (block 502). In one non-limiting example, the display sink device 318 is already attached to the display connector 310 of the USB Type-C split adapter 306 when the USB Type-C split adapter 306 is attached to the USB Type-C adapter 316. In another non-limiting example, the display sink device 318 can be attached to the display connector 310 of the USB Type-C split adapter 306 after the USB Type-C split adapter 306 is attached to the USB Type-C adapter 316. The display controller 328 in the display source device 314 detects the display sink device 318 attached to the display connector 310 of the USB Type-C split adapter 306 (block 504). The display controller 328 then communicates the display data signal 326 to at least three preconfigured display data pins among the first interface data pins 416 independent of the pin assignment negotiation with the attached display sink device 318 in the USB PD Structured VDM (block 506).

With reference back to FIG. 3, in another aspect, the display controller 328 may be configured to distribute the display data signal 326 to the preconfigured display data pins among the first interface data pins 416 of FIG. 4B independent of whether the display sink device 318 is attached to the display connector 310. In this regard, the display sink device 318 can receive the display data signal 326 upon attachment to the display connector 310, provided that the display sink device 318 is also configured to use the preconfigured display data pins among the display interface data pins 418 of FIG. 4B.

The display controller 328 may be configured to communicate the display data signal 326 according to a process. In this regard, FIG. 6 is a flowchart of an exemplary process 600 that can be employed by the display controller 328 for communicating the display data signal 326 over the USB Type-C split adapter 306 independent of the display sink device 318.

With reference to FIG. 6, the USB Type-C split adapter 306 is attached to the USB Type-C adapter 316 in the display source device 314 (block 602). The display controller 328 then communicates the display data signal 326 to at least three preconfigured display data pins among the first interface data pins 416 independent of whether the display sink device 318 is attached to the display connector 310 of the USB Type-C split adapter 306 (block 604).

With reference back to FIG. 3, as discussed earlier, by setting up the Display Alternate Mode connection 302 for distributing the display data signal 326 without relying on the PD circuit, the display source device 314 can be configured to skip the steps 202, 206, 210, and 212 of the process 200 of FIG. 2. In this regard, FIG. 7 is a signal flow diagram of an exemplary process 700 for configuring the display source device 314 of FIG. 3 to distribute the display data signal 326 over the USB Type-C split adapter 306 without requiring the PD circuit in the display source device 314.

Figure 7:
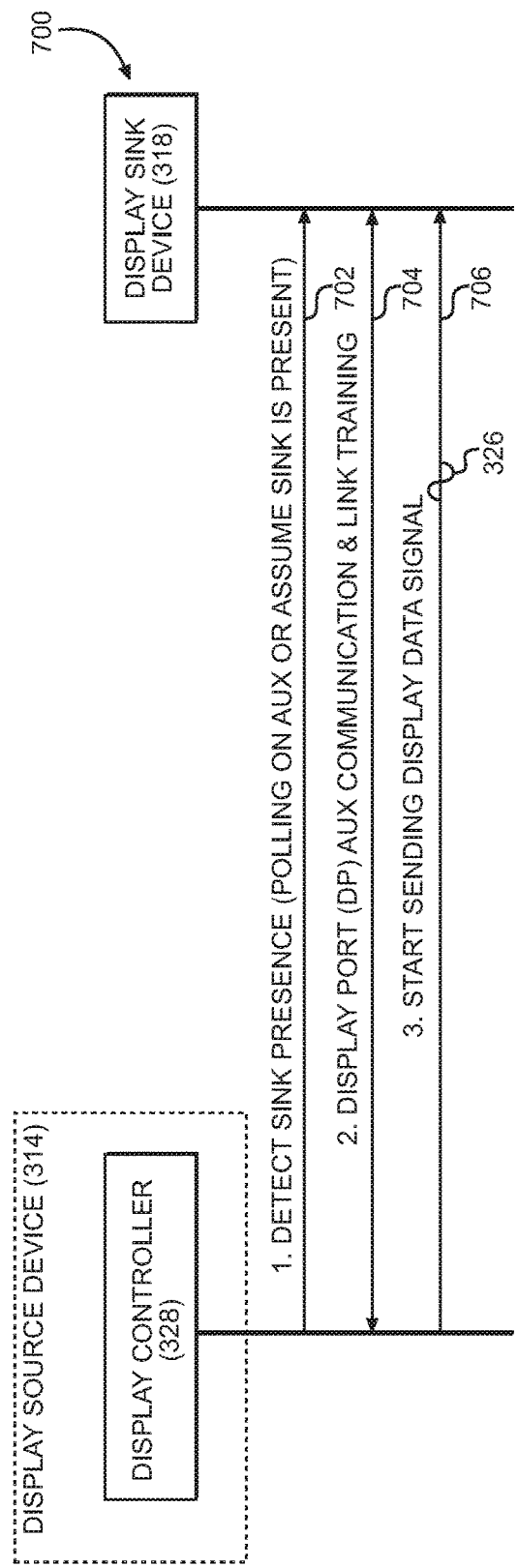
FIG. 7 is a signal flow diagram of an exemplary process for configuring a display source device to distribute a display data signal over the USB Type-C split adapter of FIG. 3 without requiring a Power Delivery (PD) circuit in the display source device.

With reference to FIG. 7, at step 702, the display controller 328 first detects presence of the display sink device 318. In one non-limiting example, the display controller 328 can detect presence of the display sink device 318 by polling the preconfigured sink device detection pin among the first interface data pins 416 of FIG. 4B. In another non-limiting example, the display controller 328 simply assumes that the display sink device 318 is present, without performing any detection step. Then at step 704, the display controller 328 performs DP auxiliary communication and link training on the Display Alternate Mode connection 302. Specifically, the display controller 328 reads a DPDC block from the display sink device 318. Next, the display controller 328 reads an extended display identification data (EDID) block from the display sink device 318. Next, the display controller 328 starts link training from the highest frequency to the lowest frequency to help determine the best resolution for the display sink device 318. In a non-limiting example, the display controller 328 can be configured to perform the DP auxiliary communication and link training in two different polarities by reversing transmit and receive pairing of the first interface data pins 416. Upon completion of the DP auxiliary communication and link training, at step 706, the display controller 328 starts communicating the display data signal 326 to the at least three preconfigured display data pins among the first interface data pins 416 of FIG. 4B.

With reference back to FIG. 3, the display source device 314 may be connected concurrently to the display sink device 318 and the USB 2.0 device 322 via the USB Type-C split adapter 306. In a first non-limiting example, the USB 2.0 device 322 is a USB 2.0 client device 322. In this regard, the USB controller 330 will function as a USB host controller 330. The USB host controller 330 detects the USB 2.0 client device 322 attached to the USB 2.0 connector 312 based on detection mechanisms defined in a corresponding USB 2.0 Specification, USB Release 3.x (USB 3.x) Specification, and/or the Type-C Specification. The USB host controller 330 may communicate a USB 2.0 data signal 332 via the second interface data pins 420 of FIG. 4B in response to detecting the USB 2.0 client device 322 attached to the USB 2.0 connector 312 of the USB Type-C split adapter 306 based on the USB 2.0 Specification, the USB 3.x Specification, and/or the Type-C Specification.

In a second non-limiting example, the USB 2.0 device 322 is a USB 2.0 host device 322, such as a personal computer (PC) or a USB charging device. In this regard, the USB controller 330 will function as a USB client controller 330. The USB client controller 330 detects the USB 2.0 host device 322 based on detection mechanisms defined in corresponding the USB 2.0 Specification, the USB 3.x Specification, and/or the Type-C Specification. The USB client controller 330 may communicate the USB 2.0 data signal 332 via the second interface data pins 420 of FIG. 4B in response to detecting the USB 2.0 host device 322 attached to the USB 2.0 connector 312 of the USB Type-C split adapter 306 based on the USB 2.0 Specification, the USB 3.x Specification, and/or the Type-C Specification.

In a third non-limiting example, the USB 2.0 device 322 is a USB charger 322. In this regard, the USB controller 330 will function as a USB client controller 330. Accordingly, the USB client controller 330 detects the USB charger 322 based on detection mechanisms defined in a corresponding USB Battery Charging Specification Release 1.2 (BC 1.2 Specification) and/or the Type-C Specification. The USB client controller 330 may receive a power signal 334 from the USB charger 322 via the interface power pin 424 of FIG. 4B in response to detecting the USB charger 322 attached to the USB 2.0 connector 312 of the USB Type-C split adapter 306 according to the BC 1.2 Specification and/or the Type-C Specification.

Figure 8:
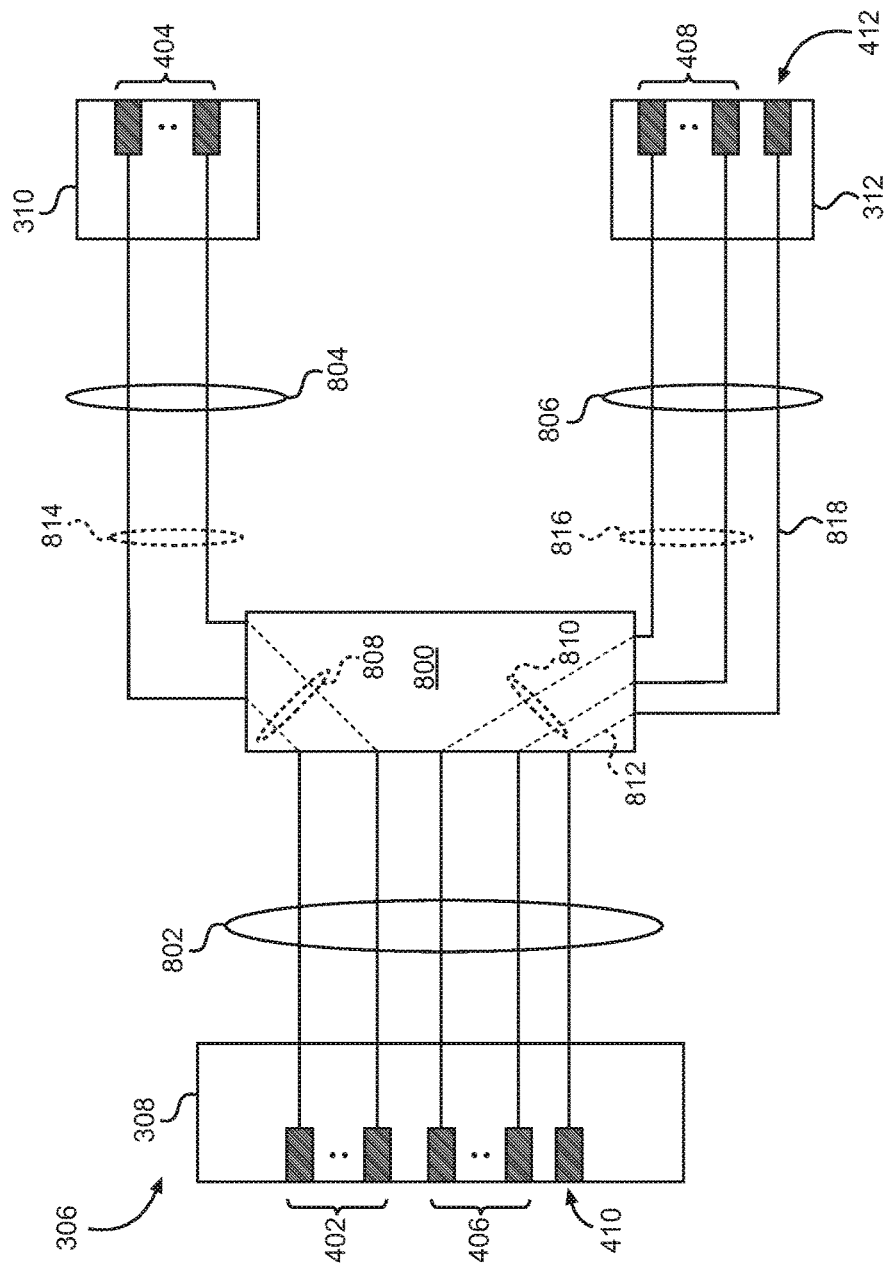
FIG. 8 is a schematic diagram providing an exemplary illustration of the USB Type-C split adapter of FIG. 3.

The conductive coupling between the first data pins 402 and the display data pins 404 and between the second data pins 406 and the USB 2.0 data pins 408 in the USB Type-C split adapter 306 is discussed next. In this regard, FIG. 8 is a schematic diagram providing an exemplary illustration of the USB Type-C split adapter 306 of FIG. 3. Common elements between FIGS. 3, 4A, and 8 are shown therein with common element numbers and will not be re-described herein.

With reference to FIG. 8, the USB Type-C connector 308 includes the first data pins 402, the second data pins 406, and the power pin 410. The display connector 310 includes the display data pins 404. The USB 2.0 connector 312 includes the USB 2.0 data pins 408 and the USB 2.0 power pin 412. The USB Type-C split adapter 306 includes a cable splitter 800, which is coupled to the USB Type-C connector 308 over a Type-C cable section 802, to the display connector 310 over a display device cable section 804, and to the USB 2.0 connector 312 over a USB 2.0 device cable section 806. The Type-C cable section 802 includes at least four first conductive wires 808 coupled to at least four of the first data pins 402. The Type-C cable section 802 includes a plurality of second conductive wires 810 coupled to the second data pins 406, respectively. The Type-C cable section 802 includes at least one third conductive wire 812 coupled to the power pin 410.

The display device cable section 804 includes at least four display device conductive wires 814 configured to couple the at least four of the first conductive wires 808 to at least four of the display data pins 404, respectively. The USB 2.0 device cable section 806 includes a plurality of first USB 2.0 device conductive wires 816 configured to couple the second conductive wires 810 to the USB 2.0 data pins 408, respectively. The USB 2.0 device cable section 806 also includes at least one second USB 2.0 device conductive wire 818 configured to couple the third conductive wire 812 to the USB 2.0 power pin 412.

Figure 9:
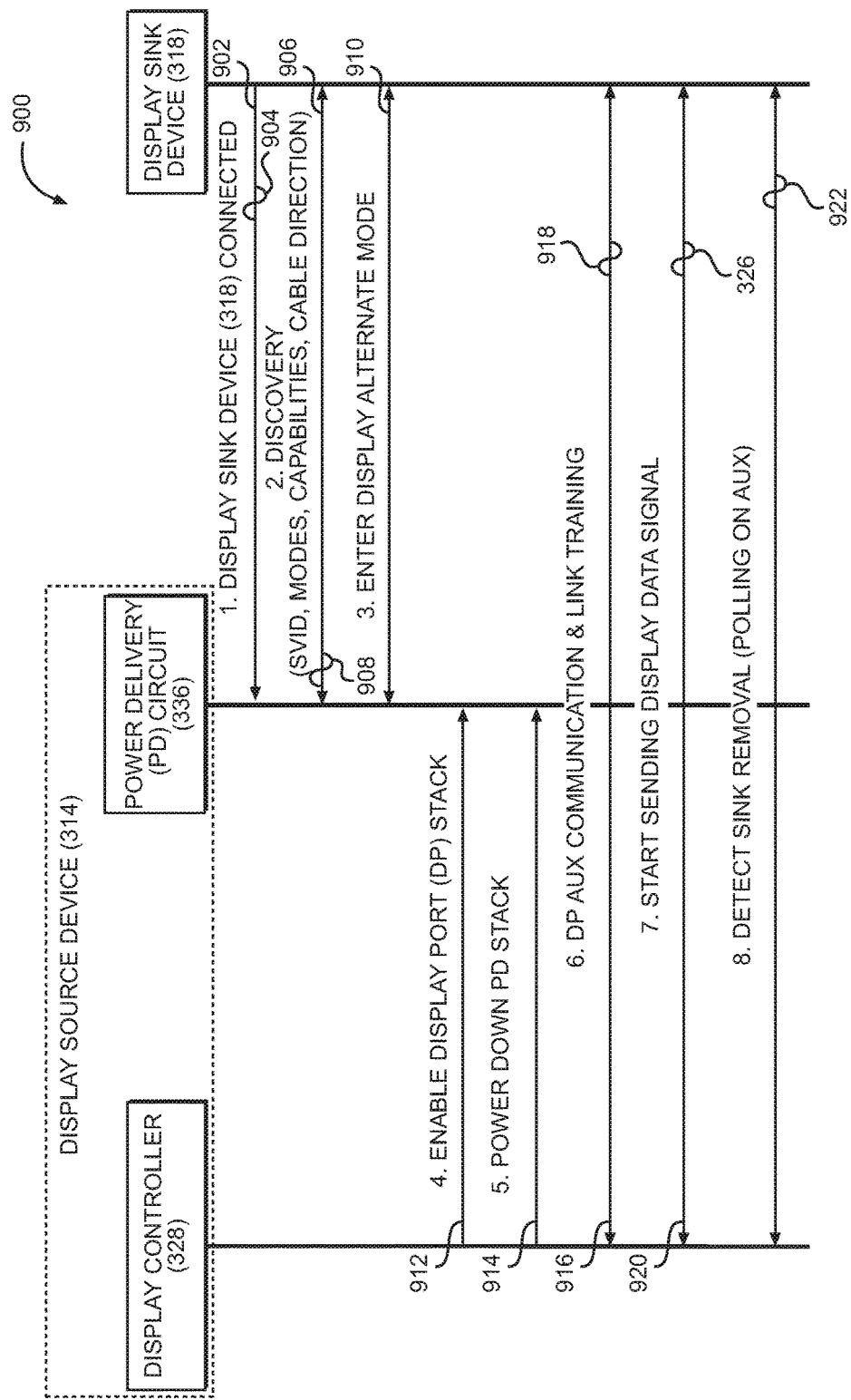
FIG. 9 is a signal flow diagram of an exemplary process for configuring a display source device to distribute a display data signal to a display sink device over the USB Type-C split adapter of FIG. 3 with a PD circuit.

With reference back to FIG. 3, the display source device 314 may include a PD circuit 336. As such, it may be possible to configure the display controller 328 to opportunistically utilize the PD circuit 336. In this regard, FIG. 9 is a signal flow diagram of an exemplary process 900 for configuring the display source device 314 of FIG. 3 to distribute the display data signal 326 to the display sink device 318 over the USB Type-C split adapter 306 with the PD circuit 336. Common elements between FIGS. 3 and 9 are shown therein with common element numbers and will not be re-described herein.

With reference to FIG. 9, at step 902, the PD circuit 336 receives an indication signal 904 when the display sink device 318 is attached to the USB Type-C split adapter 306 via the display connector 310. In response to receiving the indication signal 904, at step 906, the PD circuit 336 exchanges one or more USB PD Structured VDMs 908 for setting up the Display Alternate Mode connection 302 between the display source device 314 and the display sink device 318. The USB PD Structured VDMs 908 may include such information as Standard or Vendor Identification (SVID), modes, capabilities, and cable direction, etc. Next, at step 910, the display source device 314 and the display sink device 318 enter the Display Alternate Mode. Subsequently at step 912, the display controller 328 enables a DP software stack for processing and distributing the display data signal 326 to the display sink device 318. At step 914, the display controller 328 powers down the PD circuit 336. At step 916, the display controller 328 and the display sink device 318 exchange one or more DP auxiliary communication and link training signals 918. Subsequently, at step 920, the display controller 328 distributes the display data signal 326 to the display sink device 318 over the USB Type-C split adapter 306.

In a non-limiting example, the USB Type-C split adapter 306 can be configured to function as a USB Type-C dongle. In this regard, the USB Type-C split adapter 306 may include built-in intelligence to detect and indicate to the display controller 328 when the display sink device 318 is removed. Specifically, the display controller 328 can be configured to detect the removal of the display sink device 318 using an auxiliary polling signal 922.

In one aspect, the built-in intelligence in the USB Type-C split adapter 306 may send the auxiliary polling signal 922 to the display sink device 318 to detect the removal of the display sink device 318. Upon detecting the removal of the display sink device 318, the built-in intelligence in the USB Type-C split adapter 306 can provide indication to the display controller 328. In a non-limiting example, the built-in intelligence in the USB Type-C split adapter 306 can provide the indication to the display controller 328 via one of the first data pins 402 in the USB Type-C connector 308.

In another aspect, a dongle-side PD circuit, such as the PD circuit 336, can be embedded into the USB Type-C split adapter 306 to provide the built-in intelligence. In this regard, a bypass switch may be provided in the USB Type-C adapter 316 to enable and disable the dongle-side PD circuit. When the bypass switch is turned ON, the dongle-side PD circuit in the USB Type-C split adapter 306 is powered on. Accordingly, the dongle-side PD circuit can communicate USB PD Structured VDMs with the display source device 314 to turn off the PD circuit 336 in the display source device 314. In contrast, when the bypass switch is turned OFF, the dongle-side PD circuit will be turned off and the PD circuit 336 in the display source device 314 will function normally.

A USB system supporting display alternate mode functionality on a USB Type-C adapter according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 10:
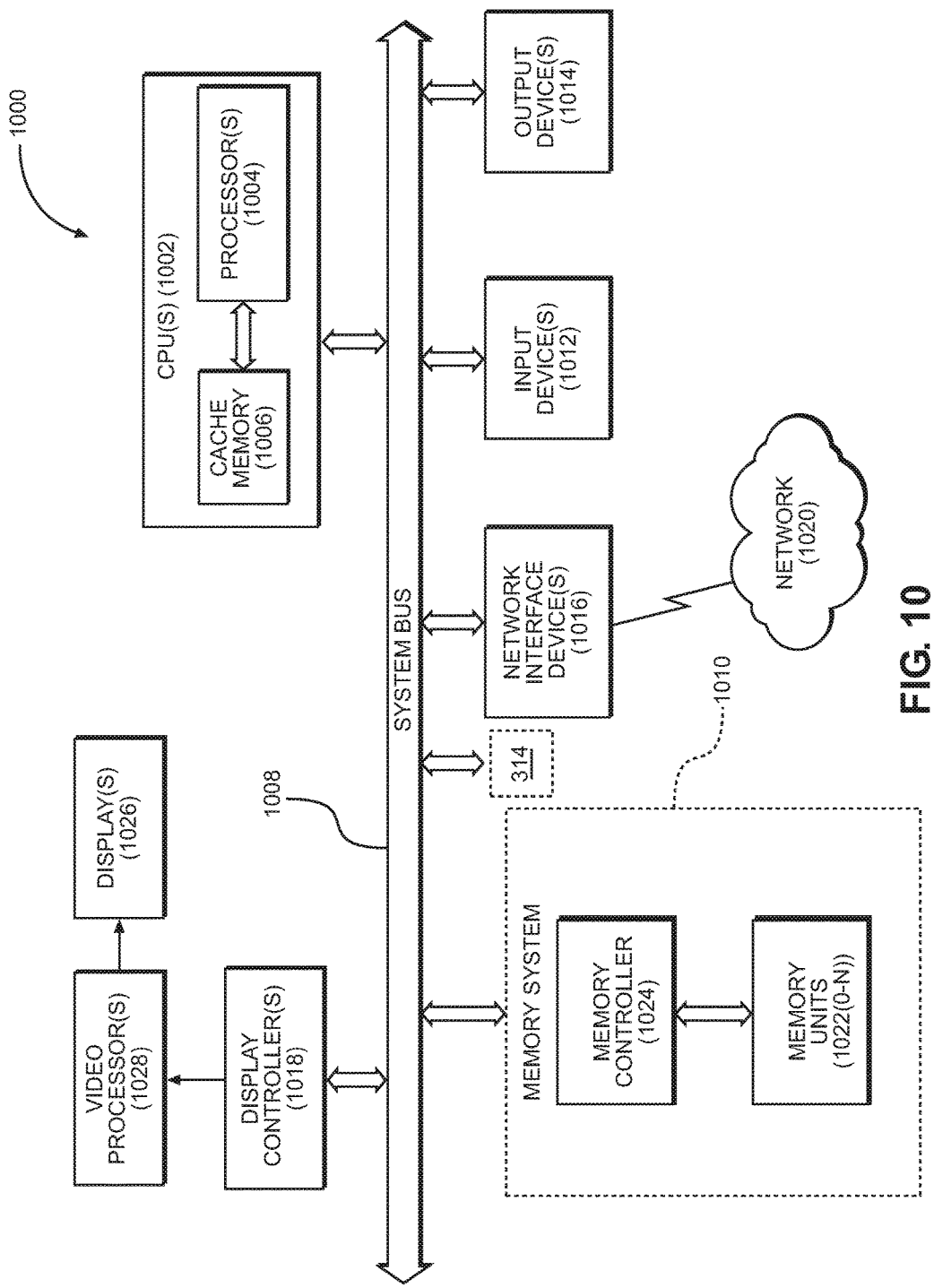
FIG. 10 illustrates an exemplary processor-based system that can support a display source device and the USB Type-C split adapter in the USB system of FIG. 3.

In this regard, FIG. 10 illustrates an exemplary processor-based system 1000 that can support the display source device 314 and the USB Type-C split adapter 306 in the USB system 300 of FIG. 3. In this example, the processor-based system 1000 includes one or more central processing units (CPUs) 1002, each including one or more processors 1004. The CPU(s) 1002 may have cache memory 1006 coupled to the processor(s) 1004 for rapid access to temporarily stored data. The CPU(s) 1002 is coupled to a system bus 1008. As is well known, the CPU(s) 1002 communicates with other devices by exchanging address, control, and data information over the system bus 1008. Although not illustrated in FIG. 10, multiple system buses 1008 could be provided, wherein each system bus 1008 constitutes a different fabric.

Other master and slave devices can be connected to the system bus 1008. As illustrated in FIG. 10, these devices can include a memory system 1010, one or more input devices 1012, one or more output devices 1014, one or more network interface devices 1016, one or more display controllers 1018, and the display source device 314 of FIG. 3, as examples. The input device(s) 1012 can include any type of input device, including, but not limited to, input keys, switches, voice processors, etc. The output device(s) 1014 can include any type of output device, including, but not limited to, audio, video, other visual indicators, etc. The network interface device(s) 1016 can be any device configured to allow exchange of data to and from a network 1020. The network 1020 can be any type of network, including, but not limited to, a wired or wireless network, a private or public network, a local area network (LAN), a wireless local area network (WLAN), a wide area network (WAN), a BLUETOOTH™ network, or the Internet. The network interface device(s) 1016 can be configured to support any type of communications protocol desired. The memory system 1010 can include one or more memory units 1022 (0-N) and a memory controller 1024.

The CPU(s) 1002 may also be configured to access the display controller(s) 1018 over the system bus 1008 to control information sent to one or more displays 1026. The display controller(s) 1018 sends information to the display(s) 1026 to be displayed via one or more video processors 1028, which process the information to be displayed into a format suitable for the display(s) 1026. The display(s) 1026 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A Universal Serial Bus (USB) system, comprising:
  a USB Type-C split adapter, comprising:
    a USB Type-C connector comprising a plurality of first data pins and a plurality of second data pins;
    a display connector comprising a plurality of display data pins conductively coupled to the plurality of first data pins in the USB Type-C connector, respectively; and
    a USB Revision 2.0 (USB 2.0) connector comprising a plurality of USB 2.0 data pins conductively coupled to the plurality of second data pins in the USB Type-C connector, respectively; and
  a display source device, comprising:
    a USB Type-C adapter, comprising:
      a plurality of first interface data pins conductively coupled to the plurality of first data pins in the USB Type-C connector, respectively; and
      a plurality of second interface data pins conductively coupled to the plurality of second data pins in the USB Type-C connector, respectively; and
    a display controller configured to:
      detect a display sink device attached to the display connector; and
      communicate a display data signal to at least three preconfigured display data pins among the plurality of first interface data pins without negotiating a pin assignment with the attached display sink device in a USB Power Delivery (PD) Structured Vendor Defined Message (VDM).

2. The USB system of claim 1, wherein the display source device further comprises a USB host controller configured to:

detect a USB 2.0 client device attached to the USB 2.0 connector; and communicate a USB 2.0 data signal via the plurality of second interface data pins in response to detecting the USB 2.0 client device attached to the USB 2.0 connector of the USB Type-C split adapter.

3. The USB system of claim 1, wherein the display source device further comprises a USB client controller configured to:

detect a USB 2.0 host device attached to the USB 2.0 connector; and communicate a USB 2.0 data signal via the plurality of second interface data pins in response to detecting the USB 2.0 host device attached to the USB 2.0 connector of the USB Type-C split adapter.

4. The USB system of claim 1, wherein:

the USB Type-C connector further comprises at least one power pin;

the USB 2.0 connector further comprises at least one USB 2.0 power pin conductively coupled to the at least one power pin in the USB Type-C connector;

the USB Type-C adapter further comprises at least one interface power pin conductively coupled to the at least one power pin in the USB Type-C connector; and the display source device further comprises a USB client controller configured to:

detect a USB charger attached to the USB 2.0 connector; and receive a power signal from the USB charger via the at least one interface power pin in response to detecting the USB charger attached to the USB 2.0 connector of the USB Type-C split adapter.

5. The USB system of claim 1, wherein the display controller is further configured to communicate the display data signal to at least four preconfigured display data pins among the plurality of first interface data pins.

6. The USB system of claim 1, wherein the display controller is further configured to communicate the display data signal to at least six preconfigured display data pins among the plurality of first interface data pins.

7. The USB system of claim 1, wherein the display controller is further configured to communicate the display data signal to eight preconfigured display data pins among the plurality of first interface data pins.

8. The USB system of claim 1, wherein the display controller is configured to detect the display sink device attached to the display connector via a preconfigured sink device detection pin among the plurality of first interface data pins.

9. The USB system of claim 1, wherein the display controller is further configured to perform display port (DP) auxiliary communication and link training in two different polarities by reversing transmit and receive pairing of the plurality of first interface data pins.

10. A Universal Serial Bus (USB) system, comprising:

a USB Type-C split adapter, comprising:

a USB Type-C connector comprising a plurality of first data pins and a plurality of second data pins;

a display connector comprising a plurality of display data pins conductively coupled to the plurality of first data pins in the USB Type-C connector, respectively; and a USB Revision 2.0 (USB 2.0) connector comprising a plurality of USB 2.0 data pins conductively coupled to the plurality of second data pins in the USB Type-C connector, respectively; and a means for providing a display data signal, comprising:

a means for interfacing with the USB Type-C connector, comprising:

a plurality of first interface data pins conductively coupled to the plurality of first data pins in the USB Type-C connector, respectively; and a plurality of second interface data pins conductively coupled to the plurality of second data pins in the USB Type-C connector, respectively; and a means for controlling the display data signal configured to:

detect a display sink device attached to the display connector; and communicate the display data signal to at least three preconfigured display data pins among the plurality of first interface data pins without negotiating a pin assignment with the attached display sink device in a USB Power Delivery (PD) Structured Vendor Defined Message (VDM).

11. A method for communicating a display data signal over a Universal Serial Bus (USB) Type-C adapter, comprising:

attaching a USB Type-C split adapter to a USB Type-C adapter in a display source device, wherein:

the USB Type-C split adapter comprises:

a USB Type-C connector comprising a plurality of first data pins and a plurality of second data pins;

a display connector comprising a plurality of display data pins conductively coupled to the plurality of first data pins in the USB Type-C connector, respectively; and a USB Revision 2.0 (USB 2.0) connector comprising a plurality of USB 2.0 data pins conductively coupled to the plurality of second data pins in the USB Type-C connector, respectively; and the USB Type-C adapter comprises:

a plurality of first interface data pins conductively coupled to the plurality of first data pins in the USB Type-C connector, respectively; and a plurality of second interface data pins conductively coupled to the plurality of second data pins in the USB Type-C connector, respectively;

detecting a display sink device attached to the display connector of the USB Type-C split adapter; and communicating a display data signal to at least three preconfigured display data pins among the plurality of first interface data pins without negotiating a pin assignment with the attached display sink device in a USB Power Delivery (PD) Structured Vendor Defined Message (VDM).

12. The method of claim 11, further comprising:

detecting a USB 2.0 client device attached to the USB 2.0 connector; and communicating a USB 2.0 data signal via the plurality of second interface data pins in response to detecting the USB 2.0 client device attached to the USB 2.0 connector of the USB Type-C split adapter.

13. The method of claim 11, further comprising:

detecting a USB 2.0 host device attached to the USB 2.0 connector; and communicating a USB 2.0 data signal via the plurality of second interface data pins in response to detecting the USB 2.0 host device attached to the USB 2.0 connector of the USB Type-C split adapter.

14. The method of claim 11, further comprising:

detecting a USB charger attached to the USB 2.0 connector; and receiving a power signal from the USB charger via at least one interface power pin in the USB Type-C adapter in response to detecting the USB charger attached to the USB 2.0 connector of the USB Type-C split adapter.

15. The method of claim 11, further comprising communicating the display data signal to at least four preconfigured display data pins among the plurality of first interface data pins.

16. The method of claim 11, further comprising communicating the display data signal to at least six preconfigured display data pins among the plurality of first interface data pins.

17. The method of claim 11, further comprising communicating the display data signal to eight preconfigured display data pins among the plurality of first interface data pins.

18. The method of claim 11, further comprising detecting the display sink device attached to the display connector via a preconfigured sink device detection pin among the plurality of first interface data pins.

19. The method of claim 11, further comprising performing display port (DP) auxiliary communication and link training in two different polarities by reversing transmit and receive pairing of the plurality of first interface data pins.

20. A Universal Serial Bus (USB) system, comprising:
a USB Type-C split adapter, comprising:
  a USB Type-C connector comprising a plurality of first data pins and a plurality of second data pins;
  a display connector comprising a plurality of display data pins conductively coupled to the plurality of first data pins in the USB Type-C connector, respectively; and
  a USB Revision 2.0 (USB 2.0) connector comprising a plurality of USB 2.0 data pins conductively coupled to the plurality of second data pins in the USB Type-C connector, respectively; and
a display source device, comprising:
  a USB Type-C adapter, comprising:
    a plurality of first interface data pins conductively coupled to the plurality of first data pins in the USB Type-C connector, respectively; and
    a plurality of second interface data pins conductively coupled to the plurality of second data pins in the USB Type-C connector, respectively; and
  a display controller configured to communicate a display data signal to at least three preconfigured display data pins among the plurality of first interface data pins independent of whether a display sink device is attached to the display connector.

21. The USB system of claim 20, wherein the display source device further comprises a USB host controller configured to:
detect a USB 2.0 client device attached to the USB 2.0 connector; and
communicate a USB 2.0 data signal via the plurality of second interface data pins in response to detecting the USB 2.0 client device attached to the USB 2.0 connector of the USB Type-C split adapter.

22. The USB system of claim 20, wherein the display source device further comprises a USB client controller configured to:
detect a USB 2.0 host device attached to the USB 2.0 connector; and
communicate a USB 2.0 data signal via the plurality of second interface data pins in response to detecting the USB 2.0 host device attached to the USB 2.0 connector of the USB Type-C split adapter.

23. The USB system of claim 20, wherein:
the USB Type-C connector further comprises at least one power pin;
the USB 2.0 connector further comprises at least one USB 2.0 power pin conductively coupled to the at least one power pin in the USB Type-C connector;
the USB Type-C adapter further comprises at least one interface power pin conductively coupled to the at least one power pin in the USB Type-C connector; and
the display source device further comprises a USB client controller configured to:
  detect a USB charger attached to the USB 2.0 connector; and
  receive a power signal from the USB charger via the at least one interface power pin in response to detecting the USB charger attached to the USB 2.0 connector of the USB Type-C split adapter.

24. The USB system of claim 20, wherein the display controller is further configured to communicate the display data signal to at least four preconfigured display data pins among the plurality of first interface data pins.

25. The USB system of claim 20, wherein the display controller is further configured to communicate the display data signal to at least six preconfigured display data pins among the plurality of first interface data pins.

26. The USB system of claim 20, wherein the display controller is further configured to communicate the display data signal to eight preconfigured display data pins among the plurality of first interface data pins.

27. The USB system of claim 20, wherein the display controller is further configured to perform display port (DP) auxiliary communication and link training in two different polarities by reversing transmit and receive pairing of the plurality of first interface data pins.

28. A Universal Serial Bus (USB) system, comprising:
a USB Type-C split adapter, comprising:
  a USB Type-C connector comprising a plurality of first data pins and a plurality of second data pins;
  a display connector comprising a plurality of display data pins conductively coupled to the plurality of first data pins in the USB Type-C connector, respectively; and
  a USB Revision 2.0 (USB 2.0) connector comprising a plurality of USB 2.0 data pins conductively coupled to the plurality of second data pins in the USB Type-C connector, respectively; and
a means for providing a display data signal, comprising:
  a means for interfacing with the USB Type-C connector, comprising:
    a plurality of first interface data pins conductively coupled to the plurality of first data pins in the USB Type-C connector, respectively; and
    a plurality of second interface data pins conductively coupled to the plurality of second data pins in the USB Type-C connector, respectively; and
  a means for controlling the display data signal configured to communicate the display data signal to at least three preconfigured display data pins among the plurality of first interface data pins independent of whether a display sink device is attached to the display connector.

29. A method for communicating a display data signal over a Universal Serial Bus (USB) Type-C adapter, comprising:

attaching a USB Type-C split adapter to a USB Type-C adapter in a display source device, wherein:
the USB Type-C split adapter comprises:
a USB Type-C connector comprising a plurality of first data pins and a plurality of second data pins;
a display connector comprising a plurality of display data pins conductively coupled to the plurality of first data pins in the USB Type-C connector, respectively; and
a USB Revision 2.0 (USB 2.0) connector comprising a plurality of USB 2.0 data pins conductively coupled to the plurality of second data pins in the USB Type-C connector, respectively; and
the USB Type-C adapter comprises:
a plurality of first interface data pins conductively coupled to the plurality of first data pins in the USB Type-C connector, respectively; and
a plurality of second interface data pins conductively coupled to the plurality of second data pins in the USB Type-C connector, respectively; and
communicating a display data signal to at least three preconfigured display data pins among the plurality of first interface data pins independent of whether a display sink device is attached to the display connector of the USB Type-C split adapter.

30. The method of claim 29, further comprising:
detecting a USB 2.0 client device attached to the USB 2.0 connector; and
communicating a USB 2.0 data signal via the plurality of second interface data pins in response to detecting the USB 2.0 client device attached to the USB 2.0 connector of the USB Type-C split adapter.

31. The method of claim 29, further comprising:
detecting a USB 2.0 host device attached to the USB 2.0 connector; and
communicating a USB 2.0 data signal via the plurality of second interface data pins in response to detecting the USB 2.0 host device attached to the USB 2.0 connector of the USB Type-C split adapter.

32. The method of claim 29, further comprising:
detecting a USB charger attached to the USB 2.0 connector; and
receiving a power signal from the USB charger via at least one interface power pin in the USB Type-C adapter in response to detecting the USB charger attached to the USB 2.0 connector of the USB Type-C split adapter.

33. The method of claim 29, further comprising communicating the display data signal to at least four preconfigured display data pins among the plurality of first interface data pins.

34. The method of claim 29, further comprising communicating the display data signal to at least six preconfigured display data pins among the plurality of first interface data pins.

35. The method of claim 29, further comprising communicating the display data signal to eight preconfigured display data pins among the plurality of first interface data pins.

36. The method of claim 29, further comprising performing display port (DP) auxiliary communication and link training in two different polarities by reversing transmit and receive pairing of the plurality of first interface data pins.

37. A Universal Serial Bus (USB) system, comprising:
a USB Type-C split adapter, comprising:
a USB Type-C connector comprising a plurality of first data pins and a plurality of second data pins;
a display connector comprising a plurality of display data pins conductively coupled to the plurality of first data pins in the USB Type-C connector, respectively; and
a USB Revision 2.0 (USB 2.0) connector comprising a plurality of USB 2.0 data pins conductively coupled to the plurality of second data pins in the USB Type-C connector, respectively;
a display sink device comprising a display connector interface, the display connector interface comprising a plurality of display interface data pins conductively coupled to the plurality of display data pins in the display connector, respectively; and
a display source device, comprising:
a USB Type-C adapter, comprising:
a plurality of first interface data pins conductively coupled to the plurality of first data pins in the USB Type-C connector, respectively; and
a plurality of second interface data pins conductively coupled to the plurality of second data pins in the USB Type-C connector, respectively; and
a display controller configured to:
detect the display sink device attached to the display connector; and
communicate a display data signal to at least three preconfigured display data pins among the plurality of first interface data pins without negotiating a pin assignment with the attached display sink device in a USB Power Delivery (PD) Structured Vendor Defined Message (VDM).

38. The USB system of claim 37, wherein the display source device further comprises a USB host controller configured to:
detect a USB 2.0 client device attached to the USB 2.0 connector; and
communicate a USB 2.0 data signal via the plurality of second interface data pins in response to detecting the USB 2.0 client device attached to the USB 2.0 connector of the USB Type-C split adapter.

39. The USB system of claim 37, wherein the display source device further comprises a USB client controller configured to:
detect a USB 2.0 host device attached to the USB 2.0 connector; and
communicate a USB 2.0 data signal via the plurality of second interface data pins in response to detecting the USB 2.0 host device attached to the USB 2.0 connector of the USB Type-C split adapter.

40. The USB system of claim 37, wherein:
the USB Type-C connector further comprises at least one power pin;
the USB 2.0 connector further comprises at least one USB 2.0 power pin conductively coupled to the at least one power pin in the USB Type-C connector;
the USB Type-C adapter further comprises at least one interface power pin conductively coupled to the at least one power pin in the USB Type-C connector; and
the display source device further comprises a USB client controller configured to:
detect a USB charger attached to the USB 2.0 connector; and
receive a power signal from the USB charger via the at least one interface power pin in response to detecting the USB charger attached to the USB 2.0 connector of the USB Type-C split adapter.

41. A Universal Serial Bus (USB) system, comprising:
a USB Type-C split adapter, comprising:
  a USB Type-C connector comprising a plurality of first data pins and a plurality of second data pins;
  a display connector comprising a plurality of display data pins conductively coupled to the plurality of first data pins in the USB Type-C connector, respectively; and
  a USB Revision 2.0 (USB 2.0) connector comprising a plurality of USB 2.0 data pins conductively coupled to the plurality of second data pins in the USB Type-C connector, respectively;
a display sink device comprising a display connector interface, the display connector interface comprising a plurality of display interface data pins conductively coupled to the plurality of display data pins in the display connector, respectively; and
a display source device, comprising:
  a USB Type-C adapter, comprising:
    a plurality of first interface data pins conductively coupled to the plurality of first data pins in the USB Type-C connector, respectively; and
    a plurality of second interface data pins conductively coupled to the plurality of second data pins in the USB Type-C connector, respectively; and
  a display controller configured to communicate a display data signal to at least three preconfigured display data pins among the plurality of first interface data pins independent of whether the display sink device is attached to the display connector.

42. The USB system of claim 41, wherein the display source device further comprises a USB host controller configured to:
  detect a USB 2.0 client device attached to the USB 2.0 connector; and
  communicate a USB 2.0 data signal via the plurality of second interface data pins in response to detecting the USB 2.0 client device attached to the USB 2.0 connector of the USB Type-C split adapter.

43. The USB system of claim 41, wherein the display source device further comprises a USB client controller configured to:
  detect a USB 2.0 host device attached to the USB 2.0 connector; and
  communicate a USB 2.0 data signal via the plurality of second interface data pins in response to detecting the USB 2.0 host device attached to the USB 2.0 connector of the USB Type-C split adapter.

44. The USB system of claim 41, wherein:
the USB Type-C connector further comprises at least one power pin;
the USB 2.0 connector further comprises at least one USB 2.0 power pin conductively coupled to the at least one power pin in the USB Type-C connector;
the USB Type-C adapter further comprises at least one interface power pin conductively coupled to the at least one power pin in the USB Type-C connector; and
the display source device further comprises a USB client controller configured to:
  detect a USB charger attached to the USB 2.0 connector; and
  receive a power signal from the USB charger via the at least one interface power pin in response to detecting the USB charger attached to the USB 2.0 connector of the USB Type-C split adapter.

* * * * *